United States Patent [19]
Malchesky et al.

[11] 4,128,479

[45] Dec. 5, 1978

[54] BLOOD-GAS EXCHANGER

[75] Inventors: Paul S. Malchesky, Painesville Township, Lake County; Yukihiko Nose, Cleveland Heights, both of Ohio

[73] Assignee: Japan Foundation For Artificial Organs, Cleveland, Ohio

[21] Appl. No.: 871,019

[22] Filed: Jan. 20, 1978

Related U.S. Application Data

[63] Continuation of Ser. No. 728,071, Sep. 30, 1976, abandoned.

[51] Int. Cl.² ............................................ B01D 31/00
[52] U.S. Cl. .......................... 210/321 B; 210/494 M; 210/497.1; 422/48
[58] Field of Search .............. 210/321 B, 494 M, 456, 210/497.1, 321 A, 321 R; 55/16; 23/258.5 M

[56] References Cited
U.S. PATENT DOCUMENTS

| | | | |
|---|---|---|---|
| 3,489,647 | 1/1970 | Kolobow | 210/321 B |
| 3,508,662 | 4/1970 | Miller | 210/321 B |
| 3,510,004 | 5/1970 | Hoeltzenbein | 210/321 B |
| 3,616,929 | 11/1971 | Manjikian | 210/456 |
| 3,709,367 | 1/1973 | Martinez | 210/321 B |
| 3,724,673 | 4/1973 | Ryon | 23/258.5 M |
| 3,794,468 | 2/1974 | Leonard | 210/321 B |

*Primary Examiner*—Charles N. Hart
*Assistant Examiner*—David R. Sadowski
*Attorney, Agent, or Firm*—Baldwin, Egan, Walling & Fetzer

[57] ABSTRACT

A unit is presented for the transfer of a gaseous component in one stream to or from a liquid component in another stream, in which a membrane assembly is wound spirally around a central rigid cylindrical core. The membrane assembly comprises a continuous length of flattened tubular membrane with a gas net passing through the intermediate portion of the membrane from end to end thereof and substantially the width of the interior of the tubular membrane. In forming the coil, a net separator is wound between the membrane layers of the coil. An inlet tube for one of the components communicates with one end of the membrane and an outlet tube for the same component communicates with the other end of the membrane. Means is provided for passing another of the components longitudinally of the coil between the membrane layers from one end of the coil to the other end. The specific embodiment of a blood oxygenator is described.

21 Claims, 17 Drawing Figures

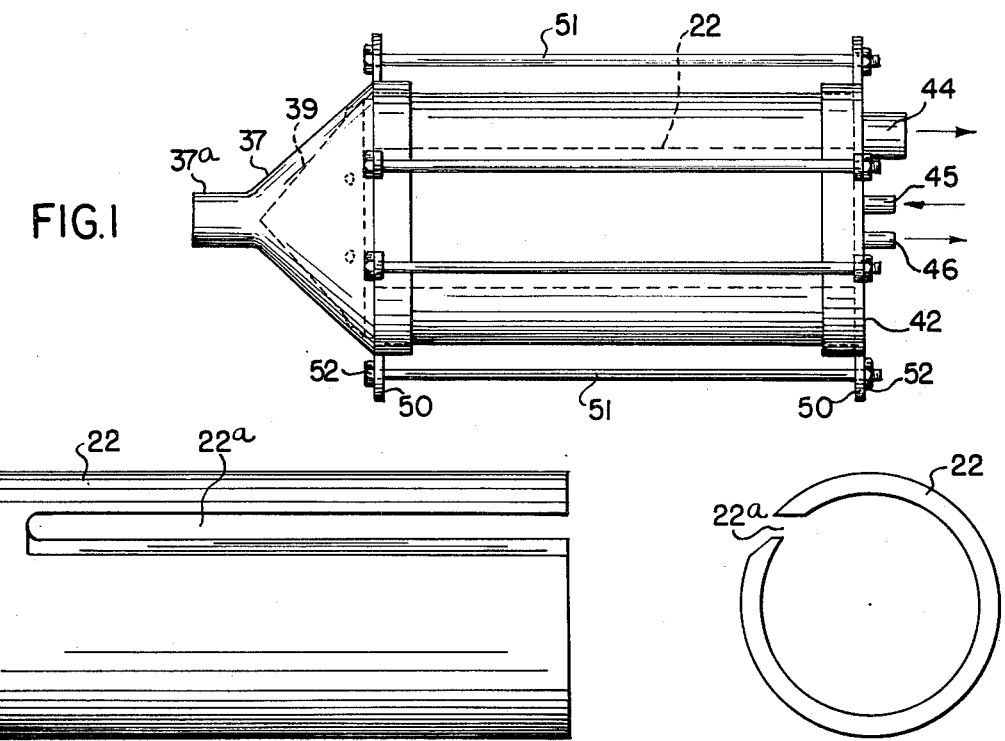
FIG.1
FIG.2
FIG.3
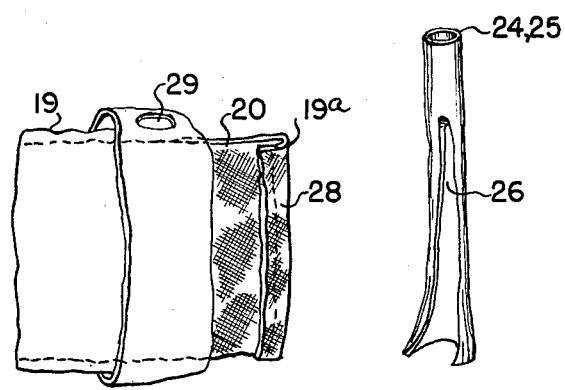
FIG.5
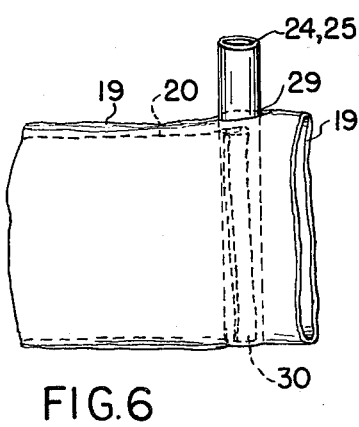
FIG.6

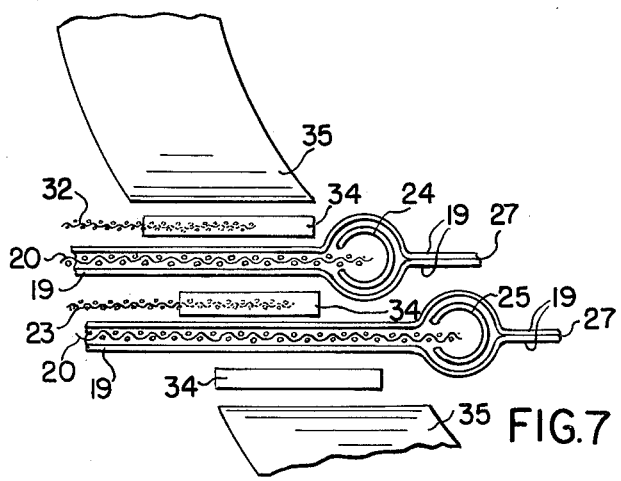
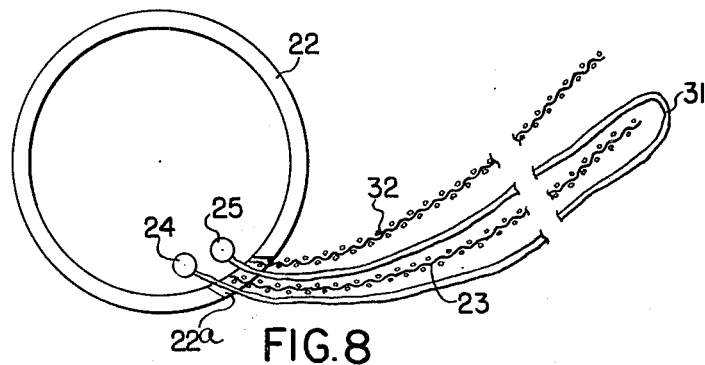
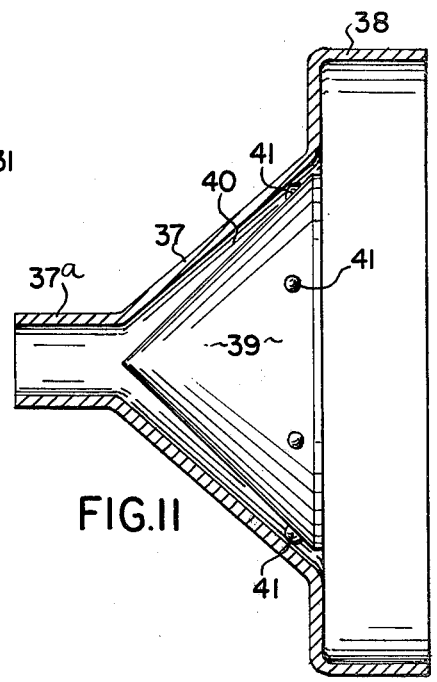
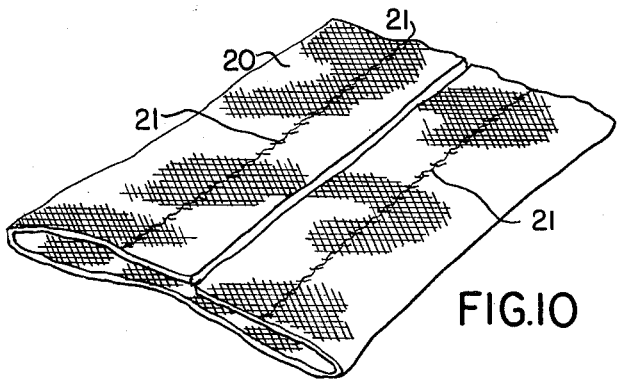
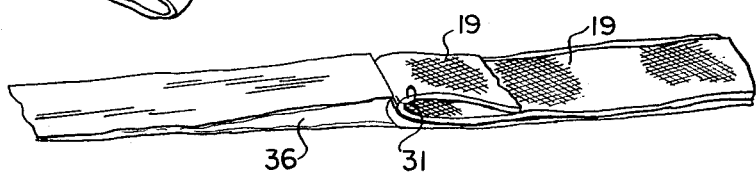

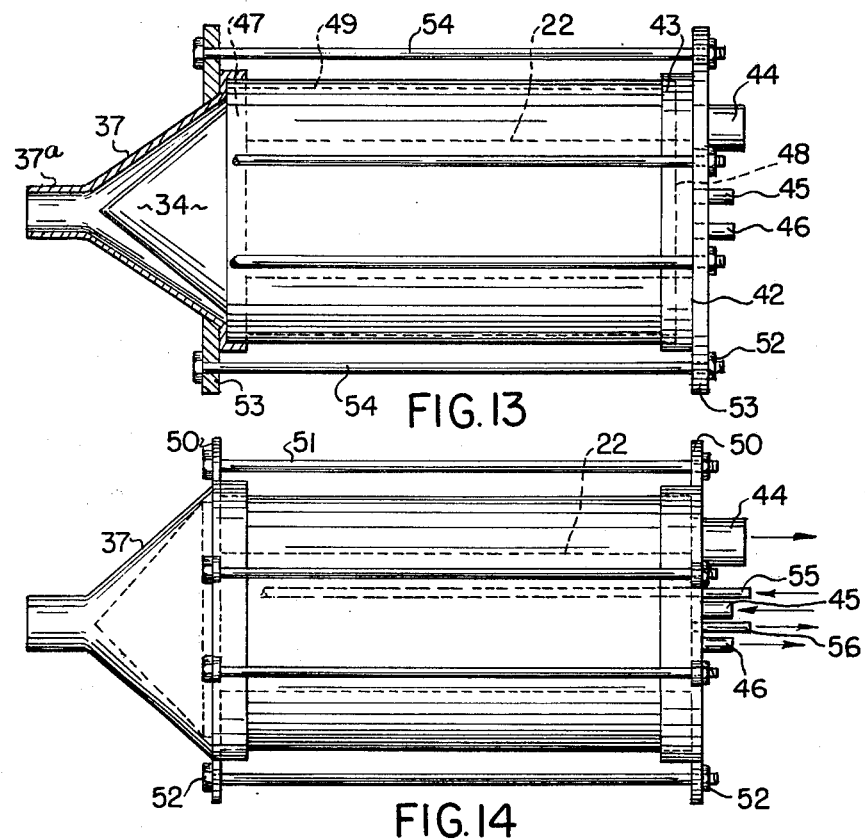
FIG.13
FIG.14
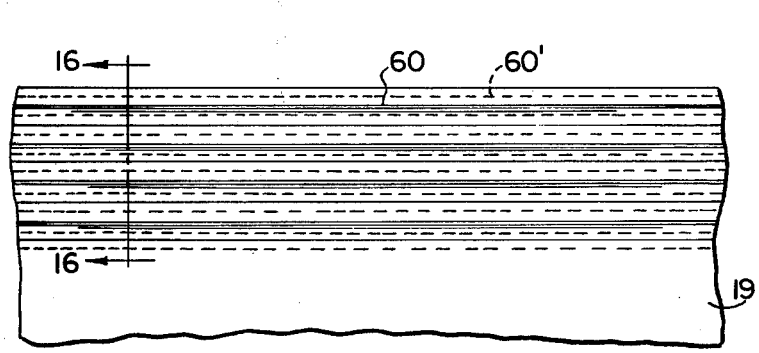
FIG.15
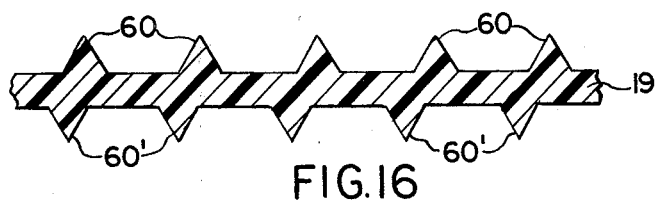
FIG.16
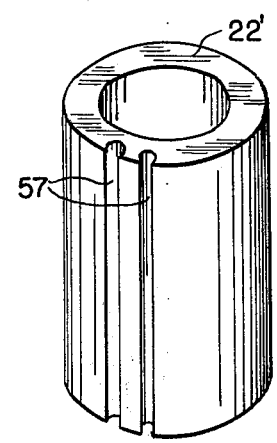
FIG.17

BLOOD-GAS EXCHANGER

This is a continuation, of application Ser. No. 728,071, filed Sept. 30, 1976 now abandoned.

BACKGROUND OF THE INVENTION

At the present time, several types of membrane oxygenators are being produced for sale in the United States of America. Most of these are of the parallel plate type although at least one is in coil form. Predominately, the membrane used is silicone rubber or microporous. As available membrane oxygenators are more expensive than the conventional bubble type devices, for short term use, membrane oxygenators must be made available at a more competitive price.

An object of the present invention, therefore, is to provide a unit capable of forming the functions for which it is intended, for instance, the transfer of a gaseous component in one stream to or from a liquid component in another stream. Specifically, with respect to a blood oxygenator, the unit must add sufficient oxygen and remove sufficient carbon dioxide to maintain a normal physiological state of the blood flow requirement. Fluid dynamic requirements must be within the constraints of the patient. Priming volume of the device, and lines, operating pressures, and flow rates must be within safe limits for the patient. Trauma to the physiological system through its use must be minimal. As long-term support may be necessary, their requirements must be satisfied for extended periods of time, such as weeks.

Such a unit, as described herein, for blood oxygenation comprises a diffusion or microporous type membrane assembly comprising a continuous length of flattened tubular membrane and a gas net passing through the intermediate portion of the membrane from end to end thereof and substantially the width of the interior of the flattened membrane, this membrane assembly being wrapped firmly in layers around a rigid cylindrical core providing a coil, with a blood net separator between the membrane layers of the coil, and with an inlet tube for one of the components communicating with one end of the membrane and an outlet tube for the same component communicating with the other end of the membrane, together with means for causing the passing of another of the components longitudinally of the coil between the membrane layers from one end of the coil to the other end.

Other objects and advantages of this invention will be apparent from the accompanying description and drawings and the essential features thereof will be set forth in the appended claims.

In the drawings,

FIG. 1 is an elevational view of the completed blood-gas exchanger;

FIG. 2 is an elevational view of a hollow cylindrical core of the unit;

FIG. 3 is an end view of the core seen in FIG. 2 taken from the line 3—3 thereof;

FIG. 5 shows an end of the membrane assembly ready to be assembled with a gas access tube;

FIG. 6 is a view showing the parts of FIG. 5 finally assembled; FIG. 7 is a diagrammatic view showing how the opposite ends of the manifold-assemblies are attached to the gas inlet and outlet access tubes while being assembled;

FIG. 8 is a diagrammatic showing of the membrane assembly and blood nets attached to the gas inlet and outlet tubes just prior to wrapping the complete assembly around the rigid core;

FIG. 9 is an end view of a sheet of netting made tubular for insertion into the central portion of the membrane tube;

FIG. 10 is a perspective view of a portion of the same gas net tube;

FIG. 11 is a sectional view through the blood inlet cap showing the position of the disperser therein;

FIG. 12 is a perspective view of a portion of the folded end of the membrane assembly and the attachment of the blood spacer adjacent the same;

FIG. 13 is a perspective view of the completed oxygenator unit showing one means limiting its expansion longitudinally;

FIG. 14 is a modified view of the unit shown in FIG. 1 equipped with a heat exchanger;

FIG. 15 is a fragmental plan view of a membrane covered with parallel ridges;

FIG. 16 is an enlarged sectional view of the same taken along the line 16—16 of FIG. 15; while FIG. 17 is a view showing a modified core having parallel longitudinally extending recesses on its outer surface to receive gas access tubes.

Figure 4:
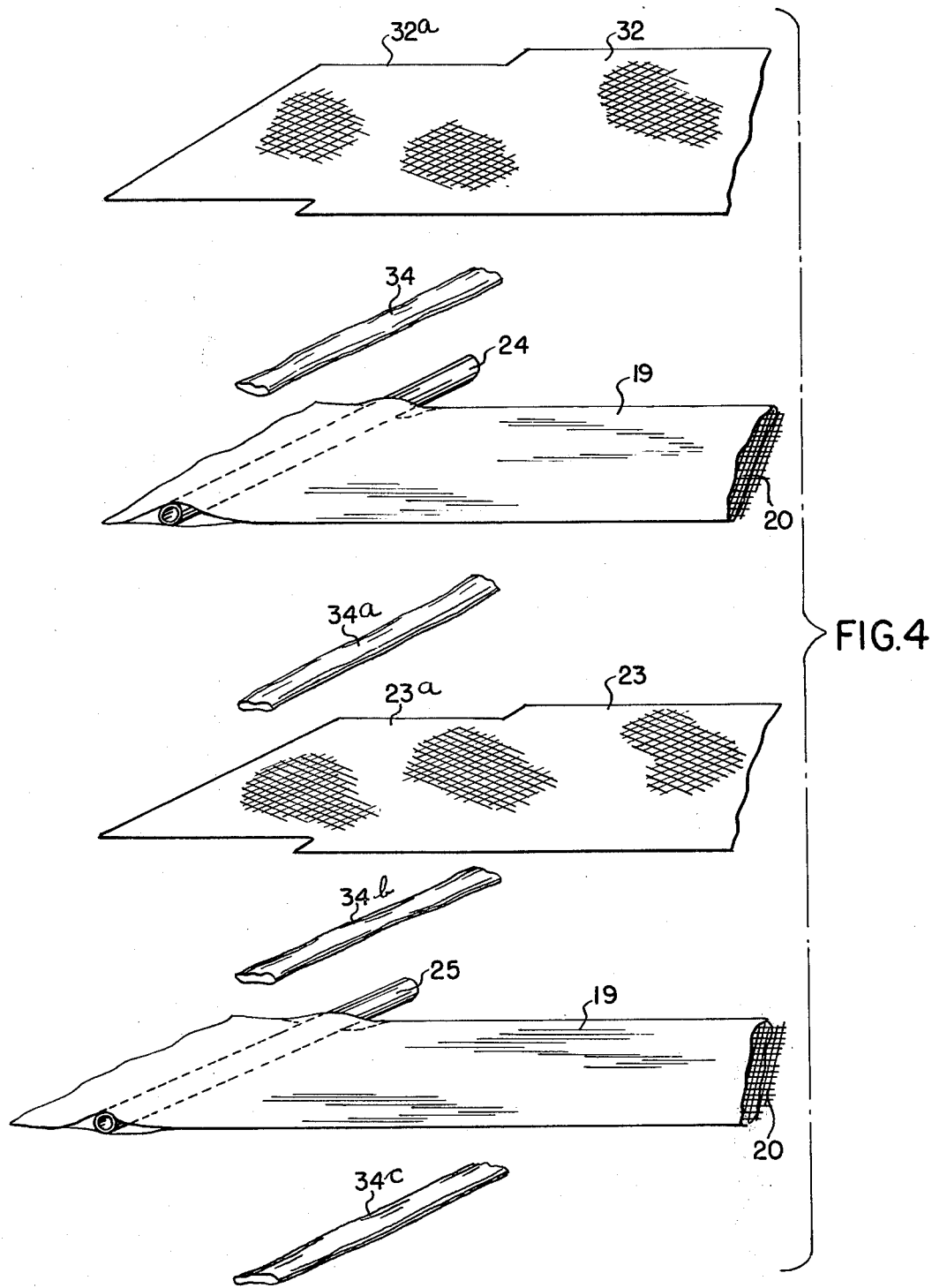
FIG. 4 is an exploded view showing the manner in which part of the manifold-assembly is put together.

A critical step in the design of a membrane oxygenator is the choice of a suitable membrane. Certain requirements must be fulfilled before a membrane can be used for blood oxygenation. In general these are:

1. Adequate O and $CO_2$ rates.
2. Biocompatability: Non-clot inducing, no leachables of extractables.
3. Mechanical integrity.
4. Does not pass blood or fluid at operating pressures — minimum water vapor loss.
5. Available in form, size and quantities suitable for the construction of such devices.

Adequate $O_2$ and $CO_2$ transfer means that the membrane must be sufficiently permeable to oxygen and carbon dioxide to achieve the desired levels of blood oxygenation and removal of carbon dioxide in the membrane area defined by the oxygenator design. An exchange of 250 ml/min of $O_2$ and 200 ml/min of $CO_2$ is normally required by an adult body at rest.

By biocompatible is meant that the membrane should not induce clot formation or cause excessive damage to blood elements. It should not release dangerous substances into the blood, or absorb any blood components to the extent that it is harmful.

The membrane must be able to maintain mechanical integrity at required operating pressures. It should not burst or develop leaks or pin holes, or be porous enough to allow either bubbling of oxygen into the blood, or hydrodynamic flow, by which blood or plasma could leak from the blood compartment into the gas compartment. Water vapor condensing in the gas phase reduces the available surface area for $O_2$ and $CO_2$ transfer, and will cause caking of powders used on some membrane surfaces to prevent adhesion. Selection of a membrane for use in a long-term pulmonary support device requires that the material not lose these behavior characteristics after a short period of use.

Further considerations from the viewpoint of manufacture and use of the membrane oxygenator are availability and sterilizability. The membrane should be available in a suitable form and in sufficient quantity for incorporation into the proposed design. The material costs should be low to allow wide spread use of the device. Finally, the material should be able to tolerate standard sterilization techniques. Sterilization should not alter the properties of the membrane.

A microporous membrane could be used in the oxygenator of this invention. After considerable testing of membranes including both diffusion and microporous types, it was decided to use a diffusion type membrane obtained from Fuji Systems Corporation of Tokyo, Japan. This testing was reported in a paper by P. Nash, P. S. Malchesky, T. Washizu, Y. Mitamura, H. Rambic, C. Carse, R. Kiraly, and Y. Nose. Small scale in vitro testing series for screening blood oxygenator membranes. Medical Instrumentation, 10:82, 1976. An earlier embodiment of this invention utilized a flat silicone rubber tubular membrane 0.120 mm thick and the flattened tube being 15 cm wide. A later embodiment, described here, shown in FIGS. 15 and 16, utilized a silicone rubber diffusion type membrane 0.004 inches thick which was formed with a series of parallel ridges 60 and 60' on each side extending lengthwise of the tube. This membrane 19 was 0.011 thick across the ridges and 14.8 cm wide across the flattened membrane tube. The ridges on this membrane were evenly spaced about 0.09 inches on one side and at about 0.08 inches on the other side, but this spacing is not critical. See FIGS. 15 and 16.

In this invention, the gaseous element passes lengthwise through the membrane tube. A separator of the width of the inside of the flattened membrane was needed in the interior of the tube to diminish the resistance to gas flow. A single strip of gas net proved to give fairly good results and was used in the present embodiment. However a unit of double thickness described herein may be provided with a substantially tubular form of gas net so as to provide two coacting layers of the separator net. The tubular net was chosen because (1) single net has rough edges which is avoided in tubular scheme; (2) it provides a lower resistance to gas flow. In the same trials three coacting layers of the separator net were employed. The two layer structure is shown in FIGS. 9 and 10 whrein a continuous long strip of gas net material 20 was cut twice the required width and the side edges bent over toward the middle and stitching applied longitudinally of the net as shown at 21 to hold the net firmly in the form of a folded flat tube. This gas net was made of square-woven Saran cylindrical filaments 0.0184 inches thick and 32 fibers per inch each way at right angles. Saran is a trademark of Dow Chemical Company for a polymerization of vinylidene chloride. In the present embodiment a tubular net was used since one of the appropriate dimensions was not available. A previously mentioned, the membrane assembly is wrapped around a central core 22 (FIGS. 2 and 3) to form a coil and the blood passage is end to end of the coil between adjacent membranes. Here again, a separator was necessary in the blood passageway to facilitate blood flow without unacceptable resistance and such a net is shown in the drawings at 23 and 32. The blood net used in this embodiment is square-woven polyester 0.010 inches thick with 60 cylindrical fibers per inch in each directin at right angles. This net might be substituted by a square-woven polyester net material 0.014 inches thick and 51 fibers per inch each direction; or by a square-woven polyester net 0.012 inches thick and 70 fibers per inch each direction.

The structure of the unit will be clearly understood bwginning with FIGS. 4 and 8. To begin with, a rigid core is supplied in the form of a hollow cylinder 22 of inexpensive plastic having no toxic effect with relation to blood. In this particular embodiment, acrylic plastic was used 2 inches inside diameter and 2½ inches outside diameter. As seen in FIG. 2, a single slot 22a was cut through the outer wall of the core at one point running parallel to the axis of the cylinder and at an angle to its radius (an earlier embodiment utilized two such slits but the single slit is preferred). A gas inlet access tube and gas outlet access tube are provided to be assembled in final form as shown respectively at 24 and 25 in FIG. 8. The membrane 19 is assembled with the gas net 20 inside the same and extending from edge to edge of the flattened tube and opposite ends of this membrane - gas net complex are secured to the access tubes as shown in FIGS. 5 and 6. In this unit, the access tubing was ¼ inch inside diameter and 7/16 inch outside diameter of silicone rubber which was of medical grade from Dow Corning Corporation of Midland, Michigan. Each gas access tube is of a length to extend across the membrane - gas net complex with additional lengths of the tubes to extend outside beyond the end of the core. Each gas access tube is slit longitudinally as shown at 26 in FIG. 5 for a length sufficient to receive the assembled end of the membrane. The end of the net intended to enter the gas access tube is folded to triple thickness and stapled together, as at 19a. This thick layer is then stapled directly to the gas access tube, and the membrane is glued around the tube as shown at 27 in FIG. 7. Care is taken to position and cover the staples 28 so that the membrane 19 will not be punctured when assembled as shown in FIG. 6. At the point 29 where the gas access tube enters or leaves the membrane, it is very tightly sealed using a silicone rubber adhesive sealant such as Silastic 732 supplied by Dow Corning Corporation of Midland, Michigan or RTV 102 supplied by General Electric Co. of Waterford, New York. The opposite end of the gas access tube at 30 is sealed with a silicone rubber molding compound known as Silastic, room temperature vulcanizing, procured from Dow Corning Corporation of Midland, Michigan.

The unit is then assembled as shown in FIGS. 4, 7 and 8. The membrane assembly, consisting of the membrane 19 with the gas net 20 inside the same, having been first secured to the inlet and outlet gas access tubes 24, 25, is folded upon itself midway between its ends as indicated at 31 in FIG. 8. Where the total membrane tube length is approximately 10½ or 11 feet long for a unit area of one square meter, the folded membrane assembly as seen in FIG. 8 is approximately half of that length. An inner blood net 32 of approximately the length of the folded membrane is assembled as shown in FIG. 4 and sealed to the core 22 on one side, upper in FIG. 4, and to the membrane 19, lower in FIG. 4, on the other side. The sandwiched blood net 23 is sealed at its end nearest the core to the membrane 31 on each side of it.

The steps of assembly are shown in FIGS. 4 and 7. The inner blood net extension 32a is placed on a strip coating 34 of silicone rubber adhesive-sealant, room temperature vulcanizing (RTV), and the adhesive must come through to the surface of the end 32a which goes against the core 22 so as to seal the blood net tightly there. Then one end of the membrane assembly with its attached gas access tube 24 is secured in the RTV adhesive. Another strip layer 34a of RTV adhesive is then placed in line with RTV 34 and blood net 23 is adhered thereto using the extension 23a as shown in the drawings. Another strip 34b of RTV adhesive is then applied and the opposite end of the membrane 19 with the gas net 20 is secured along with a final strip of RTV adhesive 34c. This assembly is shown in FIG. 7 along with two strips of polyethylene 35 which are used only to hold the lamination together until the adhesive dries.

The lamination described in FIG. 4 is now thoroughly attached to the core 22 and to the gas access tubes inside the core. The lamination is then wound around and around the core tightly and firmly ending up with the fold 31 on the outside of the coil and thus forming the end of the coiled lamination.

A blood spacer 36 is then applied, FIG. 12. This is a formed silicone rubber insert which occupies the space just beyond the peripheral fold 31 in the membrane lamination and tapers gradually beyond the fold in the direction of coil wrapping to a smooth tapered end merging smoothly into the outer face of the spiral coil. This spacer is fastened by adhesive to the last fold 31. A final complete wrap around the blood-gas exchanger unit is made with the blood net which wrap is coated with a layer of silicone rubber or other polymer and laminated to itself which makes it impermeable to fluid flow and this aids in securing the unit in place and in preventing expansion in the radial direction when the unit is in use.

The end cap 37 is then fixed to the blood inlet end of the unit. This cap 37 preferably has a conical structure terminating in a blood inlet 37a and having a peripheral rim 38 which fits firmly and snugly around the outer periphery of the end of the coiled unit. Inside of the cone shaped cap 37 is fitted a blood disperser 39 which is a plastic cone structure having less height and less base diameter than the interior cone structure of 37 so as to form a peripheral passage 40 which converges gradually around the outer face of the disperser as the blood moves inwardly from the inlet 37a toward the coil inside of the rim 38. Spacer projections 41 are preferably molded on the outer surface of the disperser near its base so as to determine the exact spacing of the disperser from the cone 37 at that location.

The other end cap 42 has a flat base with a peripheral rim 43 which is of such diameter as to fit snugly on the outer surface of the coil at that end. The member 42 has integral with its base a blood outlet 44 and slots for the passage of the gas inlet and outlet tubes 45 and 46.

It will be noted that the end caps are so constructed that pressure drop for flowing blood is low relative to pressure drop in the channels therefor in the exchanger so that a uniform flow in the channels can be achieved.

Means is provided surrounding the unit and closely limiting its expansion longitudinally and radially. For the radial expansion, a piece of heat-shrink tubing (FIG. 13) can be tightly fitted on the outside of the wound coil and tightly shrunk thereto by the use of heat in a well known fashion. However the preferred way is by binding the outer layer of blood support to itself. Longitudinal expansion is resisted either by non-extendable strips secured rigidly to the cap rims 38 and 43 at opposite ends of the coil (FIG. 1) or by the structure shown in FIG. 13 wherein plastic end caps provided with outstanding integral flanges 50 through which pass a plurality of tension bolts 31 are secured by heads and nuts 52 tightly so that the pressures exerted within the coil during its operation will not cause the structure to tend to part in a longitudinal direction. It should be understood that blood inlet and outlet ports may be reversed.

The core 22 may be solid but the central hollow portion of the core 22 may be turned into a heat exchanger as indicated in FIG. 14. Here, the inlet tube 55 for the heat modifying fluid enters at the blood outlet end of the core and extends for a major portion of the same toward the opposite end. Then an outlet is provided at 56 for the exit of the heat exchanger fluid preferably at the same end of the coil.

In the absence of a heat exchanger structure, the central portion of the core 22 may be filled with a suitable molding compound, in one instance with the Silastic RTV molding compound. This is to prevent ballooning and bursting of the membrane ends within the core, and as a safe guard against leakage where the membrane assembly is attached to the gas access tubes.

The unit described herein presents one square meter of transfer surface. Size change may be readily made by changing either the length of the membrane assembly or by changing the width of that assembly, or both. Size enlargement may be made by making multiple layer units, each unit having its own slot and gas access tubes in the core.

It will be noted that using the above described method of manifolding and winding the unit, there are no tubular obstructions in the blood compartment. Also, preferably the blood net 32 is wider than the membrane 19 to insure proper flow.

As a gas net, tubular nets are preferred or tubular nets constructed out of flat net material as shown in FIGS. 9 and 10 and designated 20. Net dimensions and thickness and spacing are dictated by the conditions desired. A composite gas net might be used, whereby a tubular structure of fine dimension net such as 32 by 32 fibers per inch is placed in contact with the membrane 19 to provide proper membrane dimensional control, and a more porous or open net structure, such as less than 32 by 32 fibers per inch, is placed inside the fine dimension tube to provide an open channel for gas flow.

As shown in FIG. 17, the gas manifold tubes 24 and 25 may be placed in recesses 57 extending longitudinally on the periphery of a core 22'. This would be alternative to the placing of the gas inlet and outlet tubes 24 and 25 inside the hollow core 22 as shown in FIG. 8.

What is claimed is:

1. A blood-gas exchanger unit comprising a central rigid cylindrical core, there being a slot means through said core extending parallel to its axis and along a major portion of the length of said core; a gas inlet and a gas outlet tube each extending longitudinally inside of said core near said slot means for a major portion of its length and each extending out beyond one end of said core; an elongated lamination consisting serially of (a) a length of inner blood net; (b) a first portion of a length of membrane assembly; (c) a length of sandwiched blood net; and (d) a second portion of said length of membrane assembly; said membrane assembly comprising a continuous length of a flattened membrane tube chosen from diffusion type and microporous type having a continuous opening extending longitudinally thereof and a continuous gas net extending substantially throughout said membrane tube; said membrane being between about 0.0005 inches and about 0.020 inches in thickness and having adequate blood and gas rates of transfer and having biocompatibility; said membrane assembly being folded upon itself midway between its ends and said folded assembly being wrapped firmly around said core with said fold in the outside wrap and sealed in that position with both ends of said membrane in the inside wrap, thus forming a generally spiral coil; opposite ends of said membrane assembly being in communication solely with said gas inlet and gas outlet tubes respectively and sealed thereto; said blood nets and said flattened membrane tube being of the same dimension longitudinally of said unit and said gas net having a slightly smaller dimension conforming to the inside of said flattened membrane tube; a blood inlet cap at one end enclosing said coil except for a blood inlet opening; a blood outlet cap at the opposite end closing said coil except for a blood outlet opening; said caps having peripheral rims snugly fitted to said coil and sealed thereto thus enclosing a spiral blood compartment; said caps spaced from the ends of said spiral coil and there providing blood manifolds; the inside of said inlet cap providing means for dispersing blood evenly and regularly from said blood inlet opening to the adjacent end of said spiral coil; means surrounding said unit and closely limiting its expansion radially; and means rigidly limiting the expansion of said unit longitudinally.

2. A blood-gas exchanger unit as defined in claim 1, wherein said gas net is substantially a flattened tube.

3. A blood-gas exchanger unit as defined in claim 1 wherein said gas net is between 20 meshes per inch each way and 32 meshes per inch each way.

4. A blood gas exchanger unit as defined in claim 1, wherein said blood net is between 50 meshes per inch each way and 70 meshes per inch each way.

5. A blood-gas exchanger unit as defined in claim 1, wherein said membrane is of silicone rubber.

6. A blood-gas exchanger unit as defined in claim 1, wherein said membrane is of microporous type chosen from the group consisting of polyethylene, polypropylene, Teflon and copolymers.

7. A blood-gas exchanger as defined in claim 5, which is a blood oxygenator, wherein said membrane is of diffusion type of silicone rubber and has a series of parallel outwardly and longitudinally extending ridges on each face thereof along said membrane about 0.011 inches between opposite ridges, and the rest of said membrane being about 0.004 inches thick.

8. A blood-gas exchanger unit as defined in claim 1, wherein said membrane is in communication with said gas inlet and outlet tubes along substantially the entire width of said membrane assembly.

9. A blood-gas exchanger unit as defined in claim 1, including a blood spacer just beyond said membrane assembly fold in the direction of wrapping, said spacer being approximately the thickness of said fold adjacent thereto and tapering therebeyond to merge smoothly into said spiral coil, said spacer being adhered to said fold and to said coil.

10. A blood-gas exchanger unit as defined in claim 1, wherein said inlet cap and said disperser being both generally conical with said disperser cone being of less height and of less base diameter than said inlet cap cone and diverging at a greater angle so that said two cones gradually converge along the entering blood stream.

11. A blood-gas exchanger unit as defined in claim 1, wherein said last named means limiting expansion radially is a cylinder of heat-shrink tubing tightly fitting outside said spiral coil.

12. A blood-gas exchanger unit as defined in claim 1, wherein said last named means limiting expansion radially is an outside wrap of said blood gas net firmly bonded to itself.

13. A blood-gas exchanger unit as defined in claim 1, wherein said last named means limiting expansion longitudinally comprises non-extendable members secured between said two end caps.

14. A unit for transfer of a gaseous component in one stream to or from a liquid component in another stream comprising a rigid cylindrical core, a membrane assembly comprising a continuous length of flattened tubular membrane and a gas net passing through the intermediate portion of said membrane from end to end thereof and substantially the width of the interior of said flattened membrane, said membrane having adequate rates for said component transfer, said membrane assembly being folded upon itself and being wrapped firmly in layers around said core and providing a coil with said fold radially outside and with both ends of said membrane tube radially inside, a net separator between said membrane layers of said coil, an inlet tube within said core at one end of said unit for one of said components and connected to and communicating there directly with one end of said membrane tube, an outlet tube within said core at said same end for said one of said components and connected to and communicating there directly with the other end of said membrane tube and means for causing the passing of another of said components longitudinally of said coil between said membrane layers from one end of said coil to the other end.

15. A unit as defined in claim 14, wherein said gaseous component inlet and outlet are within said core, whereby to cause no obstruction to flow of said liquid component.

16. A unit as defined in claim 14, wherein said core has a hollow chamber therein, and means for passing a heat exchanger fluid through said last named chamber.

17. A unit as defined in claim 14, wherein said core is solid.

18. A unit as defined in claim 14, wherein said membrane is of the diffusion type.

19. A unit as defined in claim 14, wherein said membrane is of the microporous type.

20. A unit as defined in claim 14, wherein said inlet and outlet tubes are within said core.

21. A unit as defined in claim 14, wherein said inlet and outlet tubes are held in axially parallel recesses in the outer surface of said core.

* * * * *